US009863273B2

(12) United States Patent
Bellabal et al.

(10) Patent No.: US 9,863,273 B2
(45) Date of Patent: Jan. 9, 2018

(54) ISOSTATIC SUSPENSION OF A TURBOJET BY REAR DOUBLE SUPPORT

(71) Applicant: SNECMA, Paris (FR)

(72) Inventors: Francois Robert Bellabal, Moissy-Cramayel (FR); Francois Gallet, Moissy-Cramayel (FR); Mathieu Ange Poisson, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/914,349

(22) PCT Filed: Aug. 21, 2014

(86) PCT No.: PCT/FR2014/052109
§ 371 (c)(1),
(2) Date: Feb. 25, 2016

(87) PCT Pub. No.: WO2015/028747
PCT Pub. Date: Mar. 5, 2015

(65) Prior Publication Data
US 2016/0200443 A1 Jul. 14, 2016

(30) Foreign Application Priority Data
Aug. 28, 2013 (FR) ...................... 13 58221

(51) Int. Cl.
F01D 25/16 (2006.01)
B64D 27/16 (2006.01)
(Continued)

(52) U.S. Cl.
CPC ............. F01D 25/16 (2013.01); B64D 27/16 (2013.01); B64D 27/26 (2013.01); F02C 7/20 (2013.01);
(Continued)

(58) Field of Classification Search
CPC ..... F02K 3/06; F02K 1/04; F02C 7/20; B64D 27/16; B64D 2027/262–2027/268; B64D 27/26
See application file for complete search history.

(56) References Cited

U.S. PATENT DOCUMENTS 4,266,741 A    5/1981  Murphy
5,181,675 A *  1/1993  Lardellier ............... B64D 27/18
                                                    244/54
(Continued)

FOREIGN PATENT DOCUMENTS

CA      2756914       5/2013
CN      101469647 A   7/2009
(Continued)

OTHER PUBLICATIONS

International Search Report, dated Nov. 18, 2014, Application No. PCT/FR2014/052109.
(Continued)

Primary Examiner — Pascal M Bui Pho
Assistant Examiner — Stefan Ibroni
(74) Attorney, Agent, or Firm — Blakely Sokoloff Taylor & Zafman LLP

(57) ABSTRACT

The invention relates to a bypass turbojet comprising an exhaust housing having a central hub (13) and connecting means (11) that can transmit the forces generated by the turbojet to the structure of the aircraft that it propels, said connection means being two arms extending radially from the central hub in order to cross the cold flow of said turbojet and being characterized in that they are secured to said central hub and positioned in a diametrically opposed manner in relation to each other. An additional connection means (14) extends between the hub (13) and the area (9) for securing the exhaust housing to the structure (12) of the aircraft in order to transmit the exceptional dimensioning (Continued)

loads, said connection means being on standby during normal use, without any transmission of force between said hub and said area.

13 Claims, 3 Drawing Sheets

(51) Int. Cl.
    *F02K 1/04*     (2006.01)
    *B64D 27/26*     (2006.01)
    *F02K 3/06*     (2006.01)
    *F02C 7/20*     (2006.01)

(52) U.S. Cl.
    CPC .................. *F02K 1/04* (2013.01); *F02K 3/06* (2013.01); *B64D 2027/266* (2013.01); *F05D 2220/323* (2013.01); *Y02T 50/672* (2013.01)

(56) References Cited

U.S. PATENT DOCUMENTS

| | | | |
|---|---|---|---|
| 5,205,513 A * | 4/1993 | Schilling | B64D 27/18 244/54 |
| 5,497,961 A | 3/1996 | Newton | |
| 2009/0134271 A1 | 5/2009 | Baillard et al. | |
| 2010/0040466 A1 | 2/2010 | Vauchel et al. | |
| 2011/0168836 A1 | 7/2011 | Sanz Martinez et al. | |
| 2011/0290934 A1 | 12/2011 | Journade et al. | |
| 2013/0195640 A1 | 8/2013 | Grede et al. | |

FOREIGN PATENT DOCUMENTS

| | | |
|---|---|---|
| CN | 101522524 A | 9/2009 |
| CN | 101959758 A | 1/2011 |
| CN | 102667072 A | 9/2012 |
| CN | 102781780 A | 11/2012 |
| EP | 2299067 | 3/2011 |
| GB | 2021696 | 12/1979 |
| GB | 2061389 | 5/1981 |

OTHER PUBLICATIONS

Office Action in Chinese Application No. 201480052157.7 dated Oct. 8, 2016, with English translation. 16 pages.

Office Action in Chinese Application No. 201480052157.7 dated Mar. 27, 2017, with English translation. 17 pages.

* cited by examiner

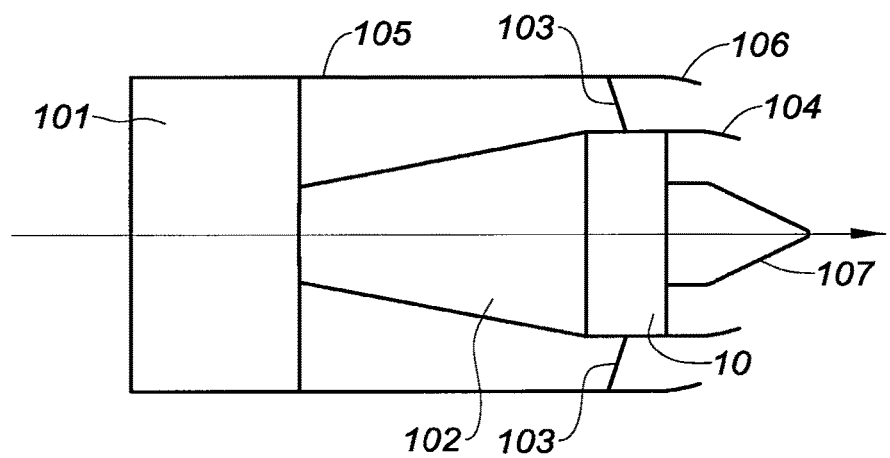
Fig. 1   -- PRIOR ART --
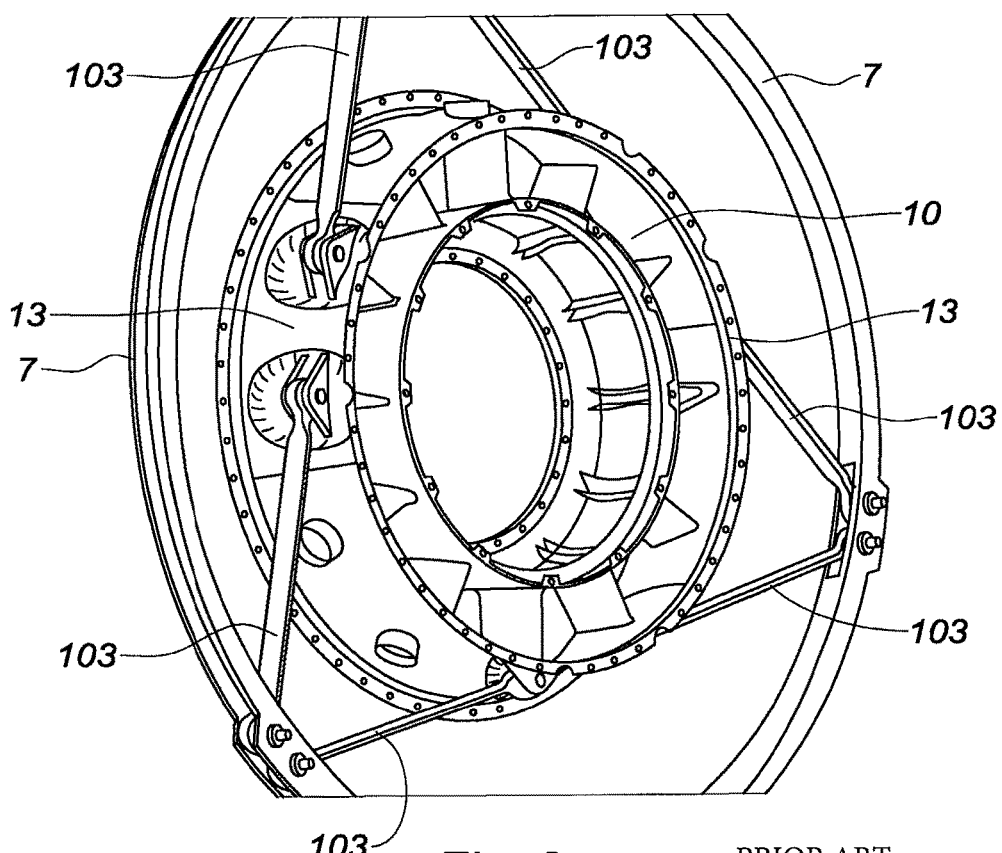
Fig. 2   -- PRIOR ART --

ISOSTATIC SUSPENSION OF A TURBOJET BY REAR DOUBLE SUPPORT

The field of the present invention is that of bypass turbojet engines. It relates in particular to the members which ensure the attachment thereof to the aircraft that they propel.

A propulsion engine, such as a turbojet engine, may be mounted at various points on the aeroplane, by being hung from a mast or strut forming part of the structure of said aeroplane. It may also be suspended under the wing, attached to the fuselage, generally to the rear, or mounted on the tail using appropriate hanging means. Said hanging means have the function of ensuring that mechanical stresses are transmitted between the engine and the structure of the aeroplane. The loads to be taken into consideration are in particular the weight of the engine along the vertical axis Z, the thrust thereof along the axis X of the engine and the lateral aerodynamic loads along the transverse axis Y. The loads to be transmitted also include the absorption of the torque about the axis of the engine. These means should also absorb, without transmitting them to the mast or the strut, the deformations sustained by the engine during the different flight phases which result, for example, from the dimensional variations caused by thermal expansions and contractions.

A conventional mode of suspension, for example, for a front-fan turboshaft engine, consists in hanging the engine from a strut which is part of the structure of the aeroplane (fuselage or wing) by a suspension or front attachment and by a suspension or rear attachment. The front suspension is attached in particular to the intermediate casing and the rear suspension is indirectly attached to the exhaust casing for the primary flow. Said two parts form the structural elements of a turbine engine and absorb all the stresses.

Modern turbojet engines are bypass turbine engines having a high bypass ratio, the secondary air flow being compressed by a single compressor stage referred to as a fan stage. Upon exiting said stage, said flow is directly guided into an exhaust nozzle via a duct in order to form part of the thrust of the engine. It thus flows between the main body of the engine, delimited by casings, and a cold-flow channel (generally denoted by the acronym OFD—outer fan duct). For reasons of weight, this channel is commonly produced from composite material. Said channel is conventionally attached to the engine by connections positioned at the two longitudinal ends thereof, a first attachment being made at the upstream end on the intermediate casing and a second attachment being made at the rear on a structural ring which is supported by the exhaust casing. The downstream part of the exhaust nozzle, comprising the thrust inverter, is attached to the structural ring, which comprises an attachment flange for this purpose.

The connection between the ring of the cold-flow channel and the exhaust casing is generally made by means of arms which pass through the cold flow. In most recent implementations, for example that illustrated by the patent application by the applicant published on 16 Nov. 2012 under the number FR2975131, said connection may also be ensured by an assembly of profiled connecting rods that are attached at one end to the cold-flow channel and at the other end to the exhaust casing. In this case, the connection is produced by a hyperstatic lattice of connecting rods, generally six or eight, which are aligned in pairs and are attached at three or four points to the structural ring as is shown in FIG. 2.

A particular problem has been encountered on the bypass engines which arises both from the relatively low rigidity of the cold-flow channel and from the lever arm being between the axis in which the engine thrusts and the position, which is offset relative thereto, of the attachment points of the engine. Said lever arm and the torque which is associated therewith would tend to deform the cold-flow channel and give it a "banana" shape between the attachment flange thereof on the intermediate casing and the structural ring. Said distortions of the engine housing are obviously detrimental to the proper operation of the engine and to the performance thereof, owing to parasitic play between the parts thereof and to the mechanical strength of the attachments, which are stressed in a non-optimal direction. In order to solve this problem, the applicant has proposed, in its patent application FR1351414 filed on 20 Feb. 2013, to ensure that the structural ring of the cold-flow channel is supported by a hoop connected to the structure of the aeroplane at two attachment points instead of one, the two points being diametrically opposed on the circumference of the ring.

This improvement, if it eliminates the deformations of the cold-flow channel, maintains a conventional connection, which is produced by a lattice of connecting rods between the structural ring and the exhaust casing. This assembly, which is hyperstatic in order to limit the various deformations to which the structural ring is susceptible, generates a large mass as a result of the number of both connecting rods and yokes which are required to ensure the attachment of these connecting rods to the exhaust casing.

The applicant therefore intends to simplify the assembly of the connection between the strut of the aeroplane and the exhaust casing, with the aim of reducing the mass thereof.

To this end, the invention relates to an exhaust casing of a bypass turbojet engine equipped with a support means which is intended to be attached to the structure of the aircraft that the turbojet engine propels, said casing, which is cylindrical, comprising a central hub and means which are intended for connecting said hub and said support means and are capable of transmitting the stresses generated in the region thereof by the turbojet engine in normal use, said connection means extending from the central hub so as to pass through the cold flow of said turbojet engine, characterised in that said connection means are arms which are rigidly connected to said central hub.

The rigidity of the arms together with them being firmly supported by the exhaust casing enables the stresses to be directly transmitted to a dedicated support means, without said stresses passing through a structural support ring of the cold-flow channel. Said ring can therefore be relieved of stress to a considerable extent.

Advantageously, the connection arms are radial arms, of which there are two, which are positioned diametrically opposite one another. This configuration is therefore isostatic, which corresponds to the minimum number of connection means required and therefore to an optimum reduction in the mass of the support means of the turbojet engine.

Preferably, the outer ends of the arms are designed to be attached to the support means by a connection of the sliding pivot type or annular linear type. This enables the movements generated by the differential deformations of the parts.

Preferably, the support means is a suspension hoop to which the outer ends of the arms are attached and which comprises an attachment zone which is capable of transmitting the stresses transmitted by said exhaust casing to the structure of the aircraft.

More preferably, the suspension hoop may be circular and surrounds the cold-flow channel of the turbojet engine.

Advantageously, the suspension hoop is semi-circular, there being two connection arms, which are positioned along a diameter which is perpendicular to the radius passing through the attachment zone.

In a particular embodiment, the equipped exhaust casing further comprises an additional connection means which extends between its hub and said attachment zone, said additional connection means being in standby position in normal use, without transmitting stress between said hub and said zone. The addition of these means allows, by dimensioning it to specifically cover the cases of failure causing exceptional loads, the arms and the support hoop to be relieved of this function and to relieve these elements of stress as much as possible.

Advantageously, said connection means is a connecting rod which is oriented radially with respect to the attachment zone and freely mounted in rotation in a radial plane about yokes respectively positioned on said hub and on said attachment zone, said connecting rod comprising a radially oriented slot at at least one of its ends, through which slot the shaft of the corresponding yoke passes.

The invention also relates to a bypass turbojet engine comprising an exhaust casing as described above.

Finally, the invention relates to a bypass turbojet engine equipped with a cold-flow channel and comprising an exhaust casing as described above, in which the additional connection means passes through the cold-flow channel by a hole without contact.

The invention will be better understood, and its other aims, details, features and advantages will become more clearly apparent on reading the following detailed explanatory description of an embodiment of the invention given as a purely illustrative and non-limiting example, with reference to the accompanying schematic drawings, in which:

FIG. 1 is a schematic view of a turbojet engine according to the prior art;

FIG. 2 is a perspective view of an exhaust casing according to the prior art, which is connected to a structural support ring of the cold-flow channel of a turbojet engine by a lattice of connecting rods;

Figure 3:
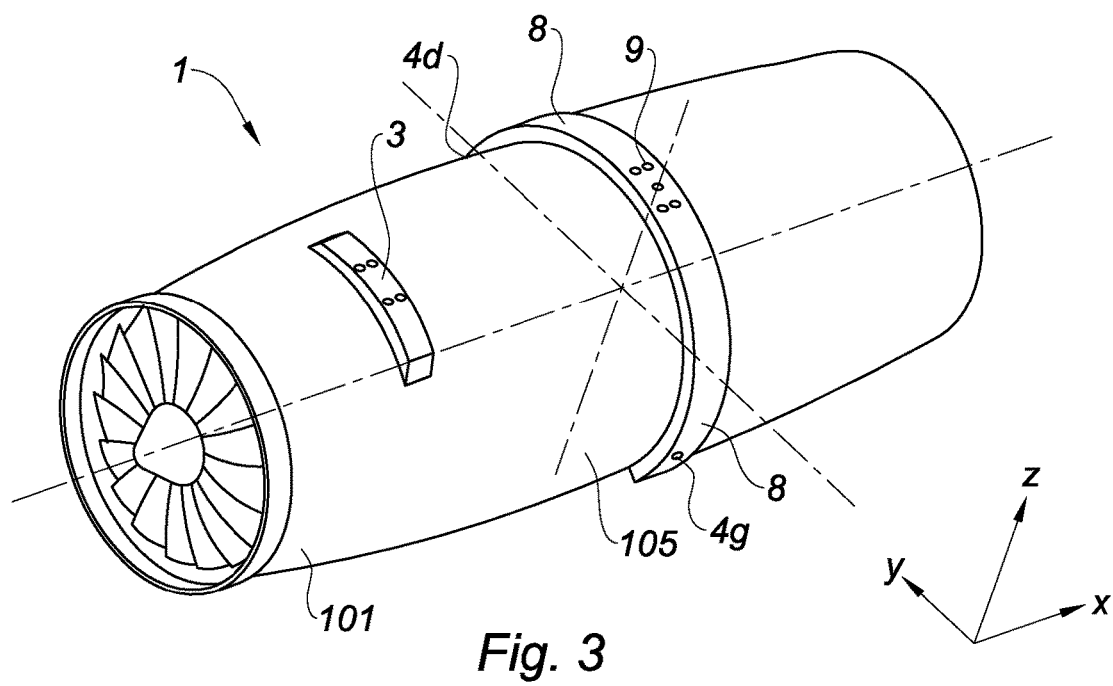
FIG. 3 is a perspective view of a turbojet engine according to the invention, equipped with its devices for hanging on the aeroplane.

With reference to FIG. 1, a stylised view of a bypass turbojet engine can be seen, comprising a fan 101, a main body 102 including, at its downstream end, an exhaust casing 10 forming part of the structure of the engine, and a rear cone 107. The primary flow, which passes through the main body, is ejected into a main exhaust nozzle 104 surrounding the rear cone, while the secondary flow, which exits the fan, is guided to the downstream end of said fan by a cold-flow channel 105 ending in a secondary exhaust nozzle 106. The cold-flow channel 105 is attached, in the region of a structural ring (not shown), to the exhaust casing 10 by a lattice of connecting rods 103, which are inclined relative to a radial plane of the engine, the attachment to the cold-flow channel being positioned upstream compared with the attachment to the exhaust casing.

FIG. 2, which shows the prior art, shows the exhaust casing 10 surrounded by a structural support ring 7 which is intended to retain, on the downstream side, the cold-flow channel 105 of this turbojet engine. The stresses associated with this retaining action are transmitted to the exhaust casing 10 by an assembly of six connecting rods 103, which are attached at one of their ends to the ring 7 and at the other end to the exhaust casing by yoke-shaped attachments. As shown in the figure, the connecting rods 103 are arranged in pairs tangentially to the exhaust casing 10 and thus form a triangle of which the points are located on the support ring 7. The rectilinear portion thereof is conventionally flattened so as to be profiled in order to provide the least possible resistance to the secondary air flow that they pass through.

FIG. 3 is a perspective view of a turbojet engine 1 equipped with its means for attaching to the aircraft on which it is mounted. Said turbojet engine is shown here in the configuration referred to as the pod configuration, under the wing, but it may equally be positioned to the side of the fuselage and may be retained by stationary attachments either on the fuselage or on the tail of the aeroplane. In this case, the turbojet engine is in a position in which it is rotated by 90°, either in one direction or the other, relative to the configuration shown, and the stresses from supporting the weight by means of the attachments are distributed differently.

The turbojet engine comprises, at the front, in the region of its exhaust casing, a front attachment point 3 which conventionally transmits the thrust stresses to the aircraft by means of a ball joint and comprises, at the rear, two rear attachment points 4d and 4g which are connected to the exhaust casing and positioned so as to be diametrically opposed to one another. A semi-circular hoop 8 is attached to these two attachment points and forms a rear suspension means for the turbojet engine. This hoop, the ends of which are attached to the two rear attachment points 4d and 4g, comprises at its centre a zone 9 for attaching to a strut or to a mast of the structure of the aeroplane, so as to fulfil, in the region of the exhaust casing 10, the same functions of transmitting stresses as the front attachment point 3 in the region of the intermediate casing. For this purpose, the attachment zone 9 is mounted on the strut 12 of the aeroplane by means of a connection which is a damping connection due to elastomeric materials and allows degrees of freedom both in rotation about the transverse axis Oy and in translation along the longitudinal axis x.

Figure 4:
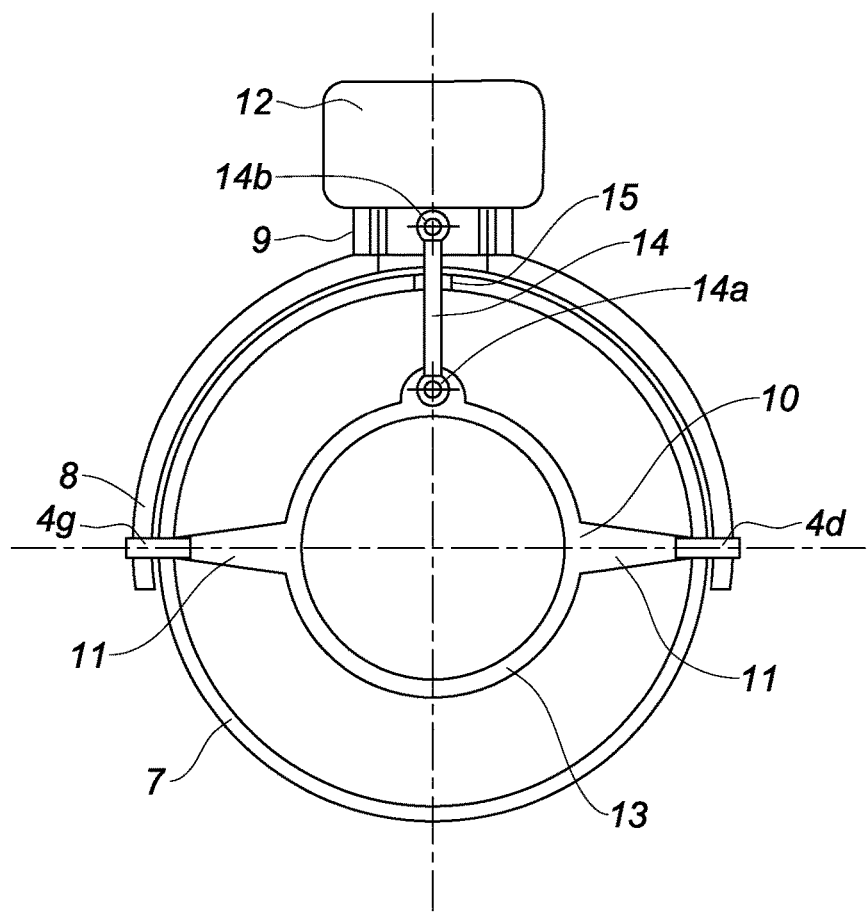
FIG. 4 is a cross section through the turbojet engine from FIG. 3 in the plane of the rear attachment thereof.

With reference now to FIG. 4, the turbojet engine 1 according to the invention is shown in section in the region of the exhaust casing 10 and of the non-structural support ring 7 of the cold-flow channel. Said figure shows the detail of the rear suspension and the way in which the strut 12 absorbs the stresses transmitted by the turbojet engine 1 in the region of the exhaust casing 10 thereof.

The exhaust casing 10 comprises two rigid arms 11 which extend radially from the hub 13 thereof and are dimensioned so as to transmit the entirety of the stresses which are exerted on the aeroplane in normal use to the strut 12 of said aeroplane. These arms pass through the support ring 7 of the cold-flow channel without transmitting stress thereto, in contrast with the prior art, and are directly attached to the ends of the hoop 8. In this way, this hoop absorbs the entirety of the stresses supplied by the turbojet engine in a radial plane yOz, in the region of the exhaust casing thereof. Regarding the support ring 7, it is simply attached to the two arms 11 to transmit the stresses (weight and bending torque or torsion torque) originating from the cold-flow channel to said arms. This situation is different to that of the prior art shown in FR1351414, in which the ring 7 is a structural ring which absorbs, by means of connecting rods, the entirety of the stresses which are exerted on the exhaust casing 10 and which transmits said stresses to the strut 12 of the aeroplane.

In the configuration according to the invention, this transmission of stresses to the suspension hoop 8 is ensured directly by the arms 11, without intervention from the support ring 7 of the cold-flow channel which can therefore be relieved of stresses to a very significant degree.

The end 4*d* or 4*g* of each of the arms 11 is shaped so as to allow it to be attached to the suspension hoop 8. Means (not shown) for attaching the ring 7 of the cold-flow channel to the arms 11 of the exhaust casing are likewise provided. The aim thereof is only to retain the cold-flow channel and not to participate, as indicated above, in transmitting stresses between the exhaust casing 10 and the structure of the aircraft.

Figure 5:
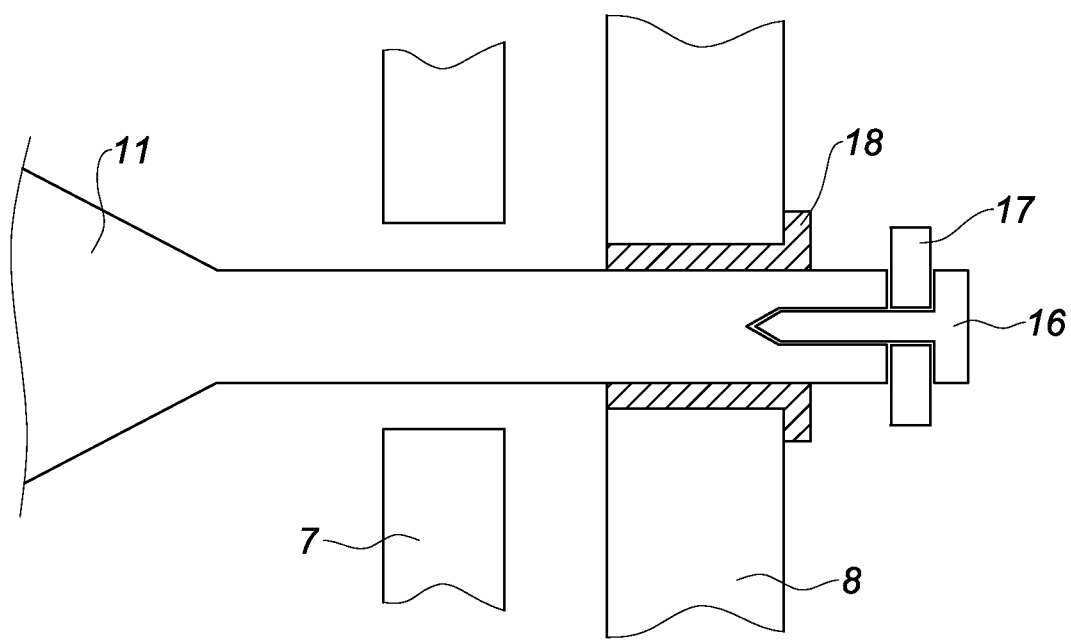
FIG. 5 is a detailed view of the junction between the structural ring and a suspension hoop of the turbojet engine.

In order to ensure these connections, connection shafts ensure, in the region of the ends 4*d* and 4*g* of the arms 11, a state of the sliding pivot type, or even of the annular linear type, between the arms 11, the ring 7 and the hoop 8. An example of such a connection, which allows the required movements between these parts to take place and takes the possible differential deformations thereof into consideration, is shown in FIG. 5. The arms 11 of the exhaust casing thus pass through a hole made in the support ring 7, which enables it to slide in the direction transverse to the support ring; it is furthermore attached to the suspension hoop 8 by a screw 16 and washer 17 assembly which forms an abutment and is allowed to rotate freely by a bushing 18 positioned between the two parts.

Finally, it is necessary, when dimensioning of the connection between the exhaust casing 10 and the strut 12, to take into consideration the exceptional stresses, also referred to as ultimate loads, which can occur for example when a blade breaks. While this case was covered in the prior art by appropriate dimensioning of the structural ring of the cold-flow channel 105 and the connecting rods 103, the applicant intends to ensure the integrity of the engine is maintained by a device which is simple and as light as possible.

For this purpose, it is provided that a device is installed which is put on standby in normal use and which only intervenes when stresses arise in the suspension hoop 8 which exceed a particular threshold. This device for relieving stress is added to the connection between the exhaust casing 10 and the strut 12 described above and is dimensioned so as to take account of the exceptional stresses which may result, for example, from a loss of blades.

As can be seen in FIG. 4, this device consists of a radially extending connecting rod 14, which is freely mounted in rotation in a radial plane by rotating connections at each of its ends. This connecting rod is mounted in a standby position, with play, in yokes, for example by means of a radially oriented slot at at least one of its ends. Its inner end is mounted on a first yoke 14*a*, which is placed on the exhaust casing 10, while its outer end is mounted on a second yoke 14*b*, which is placed on the zone 9 for attaching the hoop 8 to the strut 12. These two connections are free in rotation and the length of the connecting rod 14 is such that it is not in abutment against the shafts of the yokes in normal use. However, in the case of stresses which are abnormally high and of potentially large movements of the exhaust casing, this connecting rod comes to abut on one side against the exhaust casing 10 and on the other side against the hoop 8 in the region of the attachment zone 9 thereof, to which zone the connecting rod transmits the stresses for retaining the exhaust casing in position. It is dimensioned so as to withstand said stresses, referred to as ultimate stresses, and allows the mass thereof to be reduced by relieving the arms 11 and the suspension hoop 8 of having to be subjected to such stresses.

The connecting rod 14 passes through the support ring 7 of the cold-flow channel through a hole 15 without contact, in order not to support additional loads by means of this ring, otherwise it would be necessary to dimension the ring accordingly, which would increase its mass.

The solution proposed by the invention consists in substituting the hyperstatic lattice of connecting rods from the prior art with an exhaust casing 10 equipped with integrated arms which are connected to the suspension hoop 8. Since the number of arms is preferably two, the connection between the exhaust casing 10 and the strut 12 is therefore isostatic. This configuration is the optimum configuration in terms of reducing the mass, which is necessary in order to ensure the support of the exhaust casing.

The device for supporting the exhaust casing, which is formed by its two arms 11, is supplemented by a device 14 for relieving stress which allows the ultimate loads to be absorbed, such as those resulting for example from a loss of a blade and from not dimensioning the arms and the suspension hoop in order to withstand such loads.

Even with impaired performance of the turbine engine above a certain load threshold (for example below ultimate loads), the device proposed by the invention enables the mass of the suspension hoop 8 to be reduced, its size in terms of thickness to be reduced and the safety of the hanging system to be improved, while also reducing the mass of the exhaust casing.

The invention claimed is:

1. An exhaust casing for a bypass turbojet engine for an aircraft, said casing comprising:
   a support for attaching to a structure of the aircraft, said exhaust casing being cylindrical and comprising a central hub supported by said support by a connection, wherein said connection comprises connection arms rigidly connected to said central hub and extending radially through a secondary aft flow of the bypass turbojet engine, said connection arms passing through a cold-flow channel having an outer fan duct in which said secondary air flow is guided,
   wherein the fan duct surrounds the central hub in a radially outward direction, said connection arms are configured to transmit to said support stresses generated in the region of said central hub by the turbojet engine without transmitting the stresses to the cold-flow channel,
   wherein the support is a suspension hoop, the outer ends of the connection arms being attached to the suspension hoop, wherein the suspension hoop surrounds the outer fan duct in the radially outward direction, and
   wherein the connection arms are two radial arms, which are positioned diametrically opposite one another relative to the center of the exhaust casing.

2. The exhaust casing according to claim 1, wherein each connection arm comprises an outer end, said outer end being configured to be attached to the support by a connection of the sliding pivot type or annular linear type.

3. The exhaust casing according to claim 1, wherein said suspension hoop comprises an attachment zone for transmitting stresses transmitted by said exhaust casing to the structure of the aircraft.

4. The exhaust casing according to claim 3, wherein the suspension hoop is circular and surrounds the cold-flow channel of the turbojet engine.

5. The exhaust casing according to claim 4, wherein the suspension hoop is semi-circular, there being two connection arms positioned along a diameter, said diameter being perpendicular to the radius passing through the attachment zone.

6. The exhaust casing according to claim 3, further comprising an additional connection extending between the central hub and said attachment zone, said additional connection being in a standby position, without transmitting stress between said central hub and said attachment zone for transmitting stresses between said central hub and said attachment zone when stresses arise in said suspension hoop which exceed a predetermined threshold.

7. The exhaust casing according to claim 6, wherein said additional connection is a connecting rod dimensioned so as to withstand ultimate stresses.

8. The exhaust casing according to claim 7, wherein said connecting rod is oriented radially with respect to the attachment zone and freely mounted in rotation in a radial plane about yokes respectively positioned on said central hub and on said attachment zone, at least one radially oriented slot disposed on at least one end of the connecting rods, wherein at least one corresponding yoke of the yokes passes through a corresponding radially oriented slot of the at least one radially oriented slot.

9. The exhaust casing according to claim 6, wherein the additional connection passes through the cold-flow channel by a hole without contact to the cold flow channel.

10. A bypass turbojet engine comprising the exhaust casing according to claim 1.

11. The bypass turbojet engine according to claim 10, wherein the connection arms pass through the cold-flow channel in the region of a support ring of the cold-flow channel.

12. The bypass turbojet engine according to claim 11, wherein each arm of the exhaust casing passes through a hole made in the support ring.

13. The bypass turbojet engine according to claim 11, wherein the suspension hoop is retained by the connection arms by a fastener connecting the suspension hoop to the connection arms, said support ring not participating in transmitting stresses between the exhaust casing and the structure of the aircraft.

* * * * *